(12) United States Patent
Glad

(10) Patent No.: US 7,779,444 B2
(45) Date of Patent: Aug. 17, 2010

(54) SYSTEM AND METHOD FOR VIDEO ON REQUEST

(76) Inventor: William Glad, 1621 Forres Ave., St. Joseph, MI (US) 49085

( * ) Notice: Subject to any disclaimer, the term of this patent is extended or adjusted under 35 U.S.C. 154(b) by 504 days.

(21) Appl. No.: 11/880,548

(22) Filed: Jul. 23, 2007

(65) Prior Publication Data
US 2008/0022329 A1 Jan. 24, 2008

Related U.S. Application Data

(60) Provisional application No. 60/820,110, filed on Jul. 23, 2006.

(51) Int. Cl.
*H04N 7/173* (2006.01)
(52) U.S. Cl. .................. 725/87; 725/5; 725/10; 725/23; 725/86; 725/62; 725/133; 725/141; 725/153; 348/143; 348/157; 348/158; 707/621; 705/14.23; 705/300; 705/500
(58) Field of Classification Search .................. 725/5, 725/10, 23, 86–87, 62, 133, 141, 153; 707/621; 348/143, 157, 158; 705/14.23, 300, 500
See application file for complete search history.

(56) References Cited

U.S. PATENT DOCUMENTS

| | | | |
|---|---|---|---|
| 5,455,619 A | 10/1995 | Truckenmiller et al. |
| 5,894,320 A | 4/1999 | Vancelette |
| 5,898,680 A | 4/1999 | Johnstone et al. |
| 6,002,995 A | 12/1999 | Suzuki et al. |
| 6,130,898 A | 10/2000 | Kostreski et al. |
| 6,133,947 A | 10/2000 | Mikuni |
| 6,144,336 A | 11/2000 | Preston et al. |
| 6,181,878 B1 | 1/2001 | Honda |
| 6,195,690 B1 | 2/2001 | Weinreb |
| 6,208,379 B1 | 3/2001 | Oya et al. |
| 6,400,941 B1 | 6/2002 | Nara |
| 6,434,621 B1 | 8/2002 | Pezzillo et al. |
| 6,437,797 B1 | 8/2002 | Ota |
| 6,507,371 B1 | 1/2003 | Hashimoto et al. |
| 6,604,049 B2 | 8/2003 | Yokota |
| 6,618,593 B1 | 9/2003 | Drutman et al. |

(Continued)

OTHER PUBLICATIONS

Wikipedia, I-Report, Jan. 23, 2010, Wikipedia, http://en.wikipedia.org/wiki/I-Report, All pages.*

(Continued)

*Primary Examiner*—Jason P Salce
(74) *Attorney, Agent, or Firm*—Carter, DeLuca, Farrell & Schmidt, LLP

(57) ABSTRACT

A video on request ("VOR") system is disclosed. The VOR system includes a producer having a location device for providing location data and a video recording device. The VOR system also includes an information exchange having a producer database configured to store a producer profile having current location and status of the producer. The current location and status are continually updated based on the location data. The VOR system also includes a viewer having access to the information exchange to search the producer database for available producers within a predetermined range of a desired location. Upon finding the available producer at the desired location, the viewer requests an information segment to be produced by the producer from the desired location. The producer thereafter records the information segment and transmits the information segment to the viewer.

19 Claims, 6 Drawing Sheets

U.S. PATENT DOCUMENTS

| | | |
|---|---|---|
| 6,671,520 B1 | 12/2003 | Kim |
| 6,711,379 B1 | 3/2004 | Owa et al. |
| 6,771,971 B2 | 8/2004 | Smith |
| 6,873,851 B2 | 3/2005 | Brown et al. |
| 6,898,423 B2 | 5/2005 | Motegi et al. |
| 6,912,517 B2 | 6/2005 | Agnihotri et al. |
| 6,914,626 B2 | 7/2005 | Squibbs |
| 6,943,825 B2 | 9/2005 | Silvester |
| 6,952,558 B2 | 10/2005 | Hardacker |
| 6,954,611 B2 | 10/2005 | Hashimoto et al. |
| 6,956,599 B2 | 10/2005 | Lim et al. |
| 6,959,448 B1 | 10/2005 | Seo |
| 6,968,179 B1 | 11/2005 | DeVries |
| 6,992,619 B2 | 1/2006 | Harrison |
| 7,010,267 B2 | 3/2006 | Vanluijt et al. |
| 7,016,673 B2 | 3/2006 | Reddy et al. |
| 7,016,899 B1 | 3/2006 | Stern et al. |
| 7,031,728 B2 | 4/2006 | Beyer, Jr. |
| 7,065,370 B2 | 6/2006 | Ogaki et al. |
| 7,069,573 B1 | 6/2006 | Brooks et al. |
| 7,106,360 B1 | 9/2006 | Frederick |
| 7,142,869 B2 | 11/2006 | Juppi et al. |
| 7,142,876 B2 | 11/2006 | Trossen et al. |
| 7,146,179 B2 | 12/2006 | Parulski et al. |
| 7,149,549 B1 | 12/2006 | Ortiz et al. |
| 7,155,336 B2 | 12/2006 | Dorfman et al. |
| 7,162,254 B1 | 1/2007 | Smith |
| 7,162,532 B2 | 1/2007 | Koehler et al. |
| 7,171,218 B2 | 1/2007 | Ikeda et al. |
| 7,181,227 B2 | 2/2007 | Wilson et al. |
| 7,181,758 B1 | 2/2007 | Chan |
| 7,184,785 B2 | 2/2007 | Balley et al. |
| 7,190,960 B2 | 3/2007 | Wilson et al. |
| 7,194,354 B1 | 3/2007 | Oran et al. |
| 2002/0038456 A1* | 3/2002 | Hansen et al. ............... 725/46 |
| 2002/0108125 A1* | 8/2002 | Joao .......................... 725/139 |
| 2005/0049971 A1* | 3/2005 | Bettinger ..................... 705/51 |
| 2006/0143672 A1 | 6/2006 | Renkis |
| 2007/0011710 A1* | 1/2007 | Chiu .......................... 725/95 |
| 2007/0294222 A1* | 12/2007 | Laurila et al. ................. 707/3 |
| 2009/0044235 A1* | 2/2009 | Davidson ..................... 725/87 |

OTHER PUBLICATIONS

International Search Report No. PCT/US07/16543 dated Jan. 18, 2008.

* cited by examiner

SYSTEM AND METHOD FOR VIDEO ON REQUEST

CROSS REFERENCE TO RELATED APPLICATION

The present application claims the benefit of and priority to U.S. Provisional Application Ser. No. 60/820,110 entitled "System and Method For Viewer-Initiated Production of Information Segments" filed on Jul. 23, 2006, the entire disclosure of which is incorporated by reference herein.

BACKGROUND

1. Field

The present disclosure relates generally to a system and method for video on request ("VOR"), which match clients and video providers based on clients' requirements and providers' location and availability. Once the match is made, the VOR system provides for recording and transmitting of live video segments and other information from the providers to the clients.

2. Description of the Related Art

Presently there is a need for on request video production. Although live news reporting is widely available, such video production methods are costly and suffer from lengthy setup times. This requires moving professional reporters, camera crews and mobile equipment to the scene of breaking news events. Many inconveniences arise in the production of news coverage and other eye-witness accounts, particularly when the occurrence of events or the interest of viewers in an event or a location cannot be predicted in advance. Further, it is often the case that a news organization is unable to get professional news teams and equipment to the scene of a breaking news event before the event is over, either because the event is too far away or because the news teams are unavailable.

Realizing the shortcomings of conventional broadcasting methods, attempts have been made to make the coverage and broadcast of events more flexible. When professional news teams are unable to be deployed at the scene of a breaking news event, networks and local stations sometimes use video and audio reports produced by people who happen to be at the scene in place of professional reporters. More and more, part-time or amateur producers are being recognized as important sources of reportage for breaking events. In a parallel development, Internet forums have been developed to enable video producers to upload videos, and to enable viewers to find films and videos of interest and to watch them after they have been uploaded and stored at various websites. Once the video is uploaded, these websites allow video producers to tag, index and/or share videos such that visitors to these websites can easily view the first-hand accounts captured by the uploaded videos. Although the video producers can tag their video with a location and/or event location where the video originated, such websites to do not provide for live video nor do such websites provide for video to be produced in response to a viewer request.

Other websites provide live video feeds from stationary webcams installed throughout the world. These websites allow video streams to be tagged with location information at the time the feed is produced. The websites also provide for searching the feeds based on location. However, these live stream websites do not include a system or method for publishing the location of a producer who is not already transmitting a live video stream. Since the live feeds are from stationary cameras, these websites are not configured to provide viewers with live video segments produced in response to viewers requests.

Yet another type of website provides producers with the software and methods to produce live video streams from anywhere in the world, using video-capable cellular phones instead of fixed web cams. The producers manually tag the location or event from which the live video stream is originating. These websites also allow the viewers to watch videos live or on-demand, and viewers can concurrently see the location the video is originating from represented as a dot or moving direction path on a satellite map. Like other websites, these sites do not include a system or method for publishing the location of producers who are not transmitting a live video stream and do not provide a method for commissioning the production of video segments that are not already produced or scheduled to be produced.

Certain news organizations have recently begun soliciting amateur news broadcasts, in effect expanding their use of so-called "stringers," amateur or part-time producers. The networks have been inviting stringers to upload video to their websites, where the content is reviewed and published. However, these websites do not allow stringers and other video producers to publish their current locations and do not provide for viewers to directly request news segments based on the location of a stringer and his or her proximity to a breaking news event. In each case, the producer continues to drive the system by recording and uploading video segments to the site, similar to the websites discussed above.

All of these improvements suffer from the lack of a system and method that allows potential viewers to directly and immediately determine what is produced and distributed by requesting the production and distribution of video segments based on viewer's knowledge of the location of a producer. In every case, these improvements still rely on producer-initiated programming. Whether the producer is an amateur eye-witness at the scene of a breaking news event who calls the network or local television station, an amateur eye-witness who uploads video or who streams live video at a website, the act of recording and transmitting the segment is always initiated by the producer—not by the potential viewer. None of the improvements provide a method whereby interested viewers may commission the immediate production and distribution of video from a specific location. As a result, news organizations must rely on a person with a cellular telephone or other device who happens to be at the scene of a breaking news event. If no one is recording and broadcasting video of the breaking event, the news organization has no way of locating a producer who is at or near the event and willing to generate a video segment, because the news organization has no way of locating producers who are not currently broadcasting videos. Conversely, news organizations and other websites are not able to advertise their interest in video from a specific location or event to independent producers. Thus there is a need for a system and method which allow users to request production of video.

SUMMARY

Unlike broadcast or video on demand ("VOD") systems that distribute in-progress or pre-recorded material to viewers on a producer's schedule or on demand, the present disclosure provides for a video on request ("VOR") system that allows potential viewers to initiate the production of video segments, based on specific viewer's request for a specific location and availability of producers at that location. The present disclosure allows viewers to decide directly what is produced by requesting the production of the video segment in real time. Video producers advertise their current locations to potential viewers who are then able to request that the producers immediately record and transmit live video segments from those locations.

One possible application of the present disclosure is to manage stringers for news networks. News organizations may determine the location of stringers worldwide, allowing the networks to determine if a stringer is available at or near the location of a breaking news event. Once an available stringer is located, the news organization contacts the stringer to commission live video from that specific location or event or from a location nearby. The system according to the present disclosure allows stringers to originate live video from their location or a nearby location in response to the request and to make the live video available to the news organization and other viewers directly or through the information exchange.

According to one aspect of the present disclosure, a video on request ("VOR") system is provided. The VOR system includes a producer having a location device for providing location data and a video recording device. The VOR system also includes an information exchange having a producer database configured to store a producer profile having current location and status of the producer. The current location and status are continually updated based on the location data. The VOR system also includes a viewer having access to the information exchange to search the producer database for available producers within a predetermined range of a desired location. Upon finding the available producer at the desired location, the viewer requests an information segment to be produced by the producer from the desired location. The producer thereafter records the information segment and transmits the information segment to the viewer.

According to another aspect of the present disclosure, a VOR system is provided. The VOR system includes a cellular phone associated with a producer. The cellular phone includes a location device for providing location data and is configured to record and stream video. The cellular phone is also connected to a telecommunications network. The VOR system also includes an information exchange server which has a producer database configured to store one or more producer profiles. The producer profiles store one or more producer properties, including a current location and status of the producer. The current location and status are continually updated based on the location data. The information exchange server also includes a search engine for searching the producer database. The VOR system further includes a news organization server configured to access the search engine to search the producer database for the producer which is available and within a predetermined range of a desired location. Upon finding the producer which is available and at the desired location, the news organization server requests an information segment to be produced by the producer from the desired location. In response to the request, the producer records the information segment and transmits the information segment to the news organization server.

A method for providing a video on request service is also contemplated by the present disclosure. The method includes the steps of generating a producer profile associated with a producer having a location device for providing location data and a video recording device. The producer profiles stores one or more producer properties, including a current location and status of the producer. The producer profile is stored in a producer database of an information exchange. The method also includes the steps of updating the current location and status based on the location data and searching the producer database for the producer which is available and within a predetermined range of a desired location. The method further includes the steps of requesting an information segment to be produced by the producer from the desired location.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
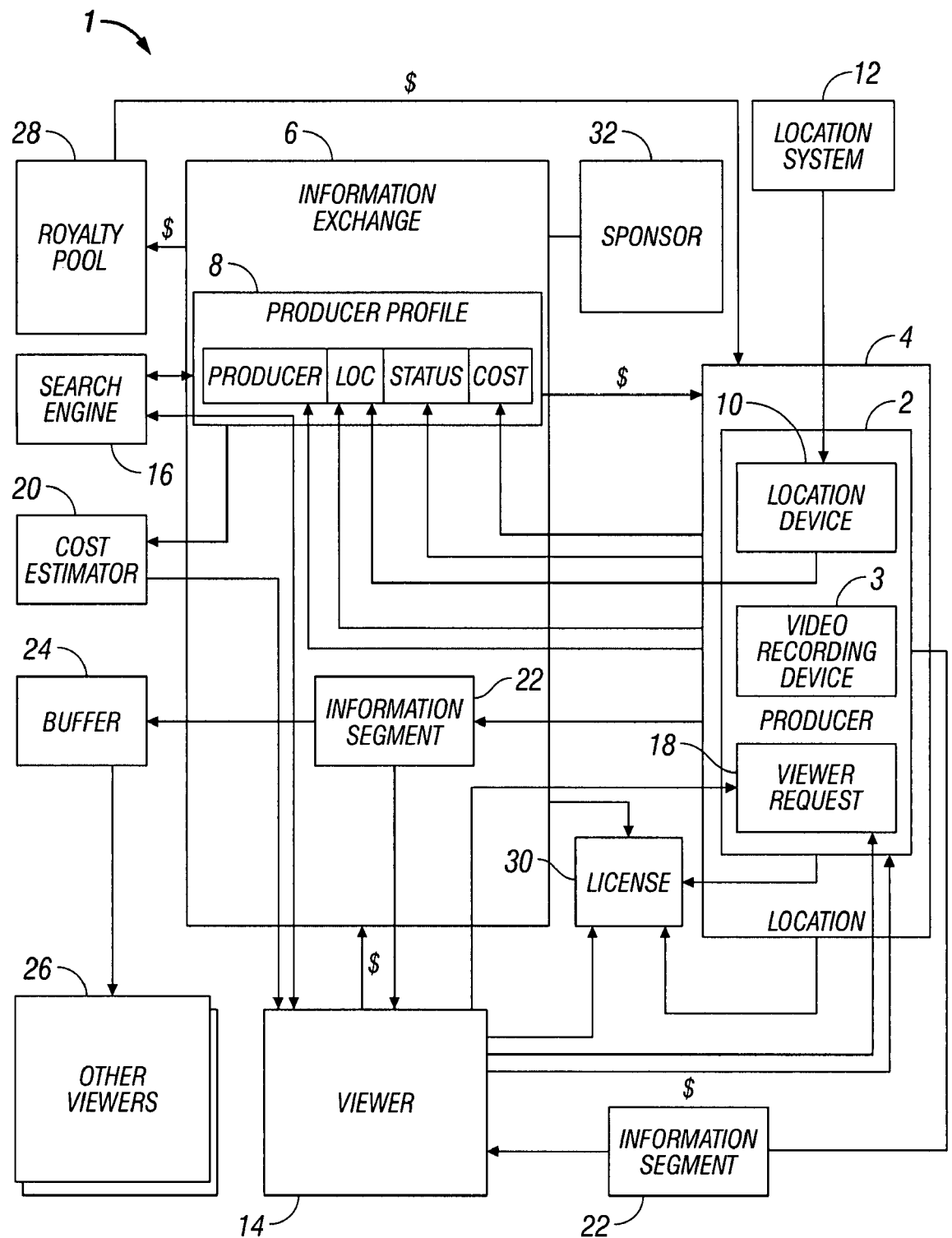
FIG. 1 is a schematic diagram of a video on request ("VOR") system according to present disclosure.

Particular embodiments of the present disclosure will be described herein below with reference to the accompanying drawings. In the following description, well-known functions or constructions are not described in detail to avoid obscuring the present disclosure in unnecessary detail.

The present disclosure also provides for a video on request ("VOR") system and method that allows potential viewers to initiate the act of recording and transmitting information segments by requesting or commissioning those segments in real time, instead of relying on producers to offer video content. The present disclosure includes an information exchange where video producers (e.g., string correspondents, stringers, etc.) advertise their current locations so that clients (e.g., news organizations and other potential viewers) may commission producers to record and transmit information from those locations or from nearby locations in real time. The disclosure provides methods whereby producers and clients register with the information exchange and whereby producers may update their availability and current locations manually, or their locations may be automatically updated using the Global Positioning System ("GPS") or other positioning systems. The clients thereafter search the database for available producers at a desirable location. Once the producer is found and a match is made, the producers transmit segments of interest to the viewers either as point to point broadcasts from the producers to the viewers or as broadcasts through a site on the World Wide Web or other communication network. After the stream is initiated, other viewers may join a requested stream in progress and to restart the stream from the beginning. Although the disclosure describes the VOR system as applicable for transmission of video segments, the system and method according to the present disclosure can be modified for various other forms of media, such as photos, text reporting, and audio.

The VOR system also enables viewers to determine the total cost of the transaction, including recording and transmission costs, in advance of ordering a video segment. To accommodate various budgets, the system allows viewers to choose either free, (e.g., sponsored feeds) or pay per request ("PPR") feeds of the same subject matter. The sponsored feeds feature advertisers whose advertisements are matched with the most effective video streams. To further streamline ordering of video segments, the VOR enable venues to enter into licensing agreements to allow producers to record and distribute segments as well as receive royalties from a royalty pool.

The system and method according to the present disclosure may be used to manage a plurality of video producers within a news organization. The stringers may include any person having a wireless video recording device, such as a video cellular telephone, PDA, and the like. The system enables news organizations to commission stringers to produce and distribute information about breaking news events and other eye-witness material in real time, such as man-made and natural disasters, crimes in progress, sports events and traffic jams, and the like.

Using the system and method of the present disclosure, news organizations may determine the location of string correspondents who are at or near the location of breaking news events and offer those correspondents assignments. In the United States alone, there are millions of users having cellular telephones and other devices that are capable of broadcasting video. But the whereabouts of those users is unknown to broadcast news organizations. On the other hand, the users of video-equipped cellular phones may be unaware of breaking news events in their vicinity. The system and methods of the present disclosure make it possible to satisfy the need for on request production of video segments by matching the news organizations with the wireless video recording devices. The system notifies cellular telephone users of breaking news events in their vicinity and simultaneously asks the users to provide video coverage of the news events, effectively adding millions of stringers to the news organization's stringer pool.

The present disclosure also allows for matching together other kinds of potential viewers with video producers who may be at locations or events of interest to them. For example, viewers of sporting events can select which players, teams or competitions to watch where the individual athletes act as producers. Additionally, the system and method may be used to commission production and distribution of current video information about cities, restaurants and vacation spots, and to the production of any other material that may be requested in real-time or on short notice based on the needs of any potential viewer. Generally, the system and method are designed to commission and immediately produce live video on request ("VOR") and other information from a specific location where the demand for that information is unpredictable.

FIG. 1 illustrates a video on request ("VOR") system 1 which includes a producer 2 who is located at a specific location 4 (e.g., venue, breaking news event, etc.). The producer 2, which may be a person or an entity (e.g., news crew), has a video recording device 3 (e.g., video cellular phone, PDA, camcorder, etc.). In addition to the video recording device 3, the producer 2 also includes a location device 10 (e.g., Global Position System ("GPS") device), which may be either integrated into the video recording device 3 or may be a stand-alone unit. The location device 10 continuously receives positioning updates from a location system 12 (e.g., GPS satellites).

The VOR system 1 includes an information exchange 6 which is a hardware and software based module having a database and a user interface (e.g., web-based) for matching producers 2 with potential viewers 14. The producer 2 is registered with the information exchange 6 where the producer 2 maintains and publishes a producer profile 8 which includes information relating to the producer 2, such as contact information, the cost of services, current location (e.g., location 4) and status. The status denotes whether the producer 2 is available to receive requests for live video production and/or transmission from their current location. In addition, the status information may include other information about the producer, such as type of video recording device 3, additional staff at the site, etc.

Current location 4 of the producer 2 may be updated manually or automatically by the location device 10 based on the location supplied by the location system 12 or other positioning technology imbedded in their recording device or cellular telephone. The viewer 14, who desires a broadcast segment from the location 4, registers with the information exchange 6. The information exchange 6 includes a search engine 16, which is accessed by the viewer 14 to search for the producer 2 who is at or near the location 4. Once the producer 2 is found, the viewer 14 submits a viewer request 18 through the information exchange 6 or directly to the producer 2 requesting a desired information segment 22. The producer 2 then chooses to accept or reject the viewer request 18.

The cost of the requested video segment may be estimated for the viewer 14 by a cost estimator 20 prior to the viewer confirming the order for the segment. Once the viewer 14 and the producer 2 agree to proceed, the producer 2 records and transmits the information segment 20, either through the information exchange 6 or directly to the viewer 14, such as through a point-to-point connection, if the video device 3 is a cellular phone having software capable of streaming video over a wireless connection. If the information segment 22 is transmitted through the information exchange 6, the information segment 22 may be recorded in a buffer 24 as the information segment 22 is transmitted to the viewer 14. This allows for the information segment 22 to be made available to other viewers 26 who may join the broadcast of the information segment 22 while in progress or view the information 22 segment from the beginning.

The viewer 14 pays for the information segment 22 through the information exchange 6, and a portion of the proceeds is allocated to a royalty pool 28 for distribution to third parties (e.g., owners of the location 4). The interaction among the producer 2, the viewer 14, the information exchange 6 and the owner of location 4 may be governed by terms of licenses 30. The licenses 30 grant permission to record and transmit from the location 4 to the producer 2 and permission to use (e.g., transmit, view, etc.) the information segment 22 to the information exchange 6 and the viewer 14.

Additional financing options are also envisioned, such as advertising as an alternate source for paying royalties and production fees. Sponsors 32 associated with the information exchange 6 may cover part or all of the cost of the producing the information segment 22 for the viewer 14 in exchange for the opportunity to show advertising or promotional material to the viewer 22. Information concerning viewership, such as statistics about the number of viewers 14 and 26 watching the information segment 22 may help sponsors 32 allocate their advertising effectively.

Figure 2:
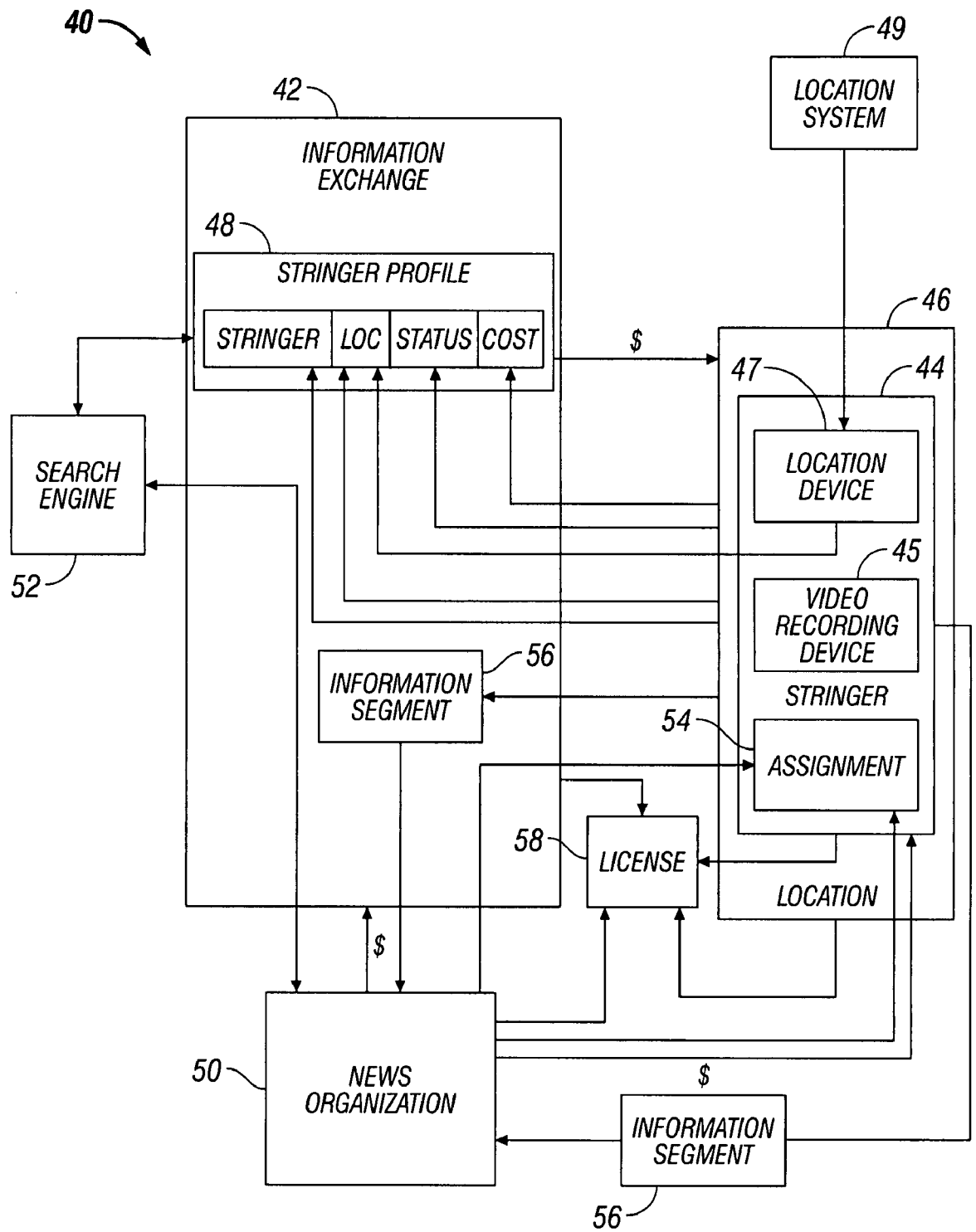
FIG. 2 is a schematic diagram of an embodiment of the VOR system configured for a news network.

FIG. 2 illustrates a media on request system 40 specifically suitable for news broadcasting. The system 40 includes an information exchange 42, one or more stringers 44 (e.g., independent news producer or news crew) who are in a specific location 46. The stringer 44 has a video recording device 45 a location device 47 which receives positioning updates from a location system 49 (e.g., GPS satellites).

The stringer 44 is registered with the information exchange 42 where the stringer 44 maintains and publishes current stringer profile 48. The profile 48 includes contact information, the cost of the production services, current location 46 and status. Status includes information about the video recording device 45 (e.g., model and make) and whether the stringer 44 is ready to receive requests to record and transmit live video from their current location. The location 46 may be updated manually by the stringer 44 or automatically by the location device 47.

A news organization 50 also registers with the information exchange 42. The news organization 50 uses a search engine 52 of the information exchange 42 to locate any available stringers 44 who are at or near the location 46. Once a suitable stringer 44 is found, the news organization 50 offers an assignment 54 to the stringer 44, either through the information exchange 42 or directly to the stringer 44. After the stringer 44 accepts the assignment 54, the stringer records and transmits the requested information segment 56, either through the information exchange 42 or directly to the news organization 50.

The news organization 50 may pay the stringer 44 directly or through the information exchange 42. The interaction between the stringer 44, the news organization 50, the information exchange 42 and owner of the location 46 may be governed by the terms of license 58 that grant permission to record, transmit and view the information segment 56 recorded at the location 46.

Figure 3:
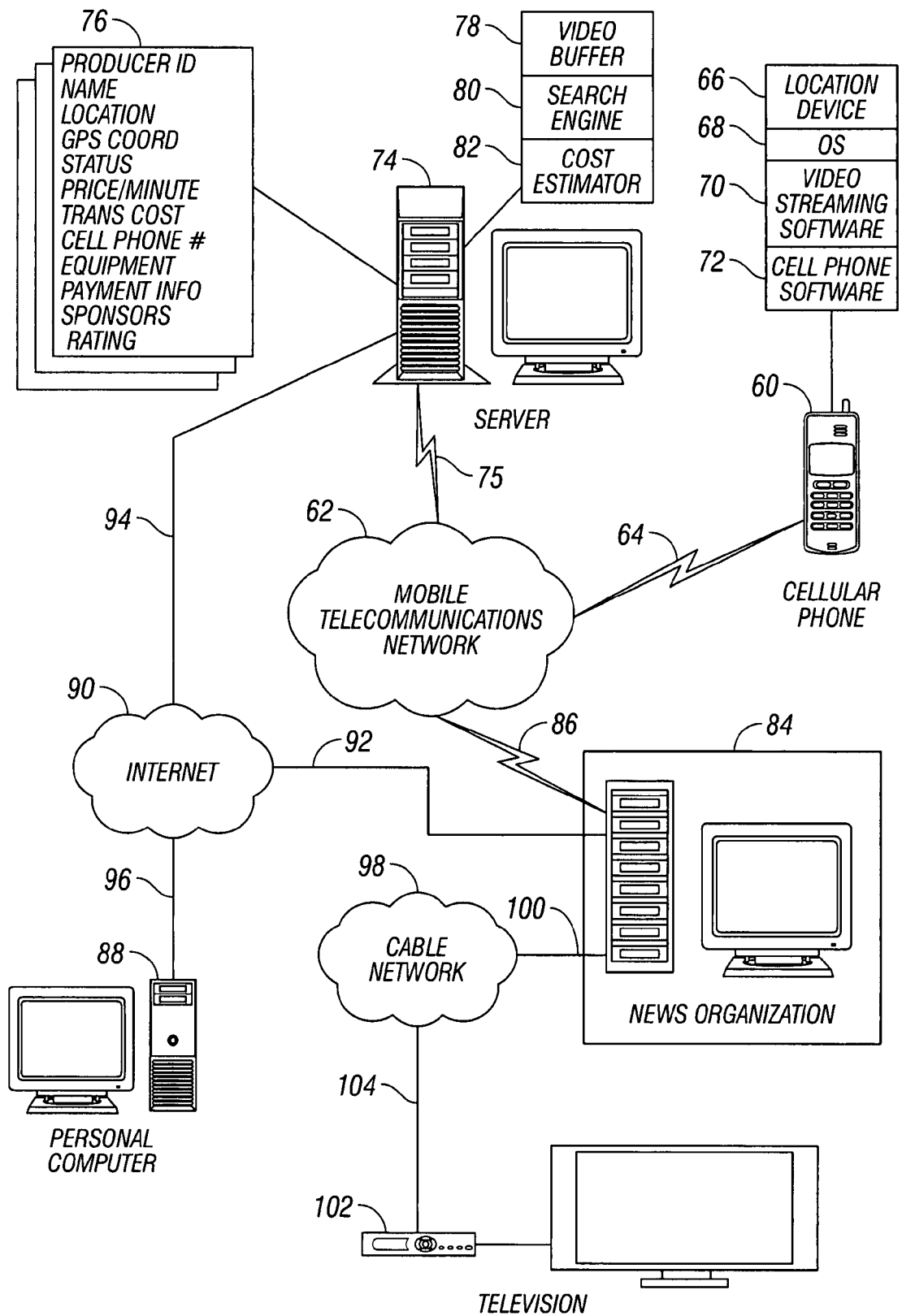
FIG. 3 is a schematic diagram of hardware components of the VOR system according to the present disclosure.

With reference to FIG. 3, hardware and software components for implementing the VOR system 1 are illustrated. The video recording device 3 is implemented as a video-capable cellular phone 60 which is connected to a mobile telecommunications network 62 through a wireless connection 64. The cellular phone has a location device 66 (e.g., GPS), an operating system 68, video streaming software 70 in addition to typical cellular phone software 72.

An information exchange server 74 is connected to the telecommunications network 62 through a wireless connection 75. The information exchange server 74 implements the information exchange 6 and/or 42 and includes a producer database 76, a video buffer 78, a search engine 80 and a cost estimator 82. The producer database 76 stores producer profiles 8 and includes producer identification granted by the information exchange server 74 at registration, name of the producer 2 and/or stringer 44, location of the producer 2 and/or stringer 44 (e.g., name of the venue, GPS coordinates, etc.), status, billing rate, transportation costs, contact information (e.g., cellular phone number, email, etc.), equipment, payment information, available sponsors, rating, and other relevant information.

The video buffer 78 may be implemented as spanning one or more storage devices (e.g., hard drive arrays) which are continuously updated and refreshed purging old content based on viewer demand. The search engine 80 is configured to allow for searching of the producer database 76 based on one or more of the criteria stored in the producer profiles 8. The search engine 80 may include a user interface, e.g., web-based interface, to allow for searching and placing of requests for information segments 22 and/or 56.

A news organization server 84 is also connected to the mobile telecommunications network 62 via a wireless connection 86. In embodiments, the news organization server 84, the information exchange server 74 and a personal computer 88 are also connected to the Internet 90 or a similar wide area network through Internet connections 92, 94 and 96, respectively. In addition, the news organization server 84 is connected to a cable network 98 by a cable network connection 100. A home television and digital video recorder 102 are connected to the cable network through cable network connection 104.

Illustrating the operation of the system, a news organization, becoming aware of a breaking news story at some location, connects to the information exchange server 74 through the Internet 90 and/or the telecommunications network 62 using the news organization server 84. The news organization uses the search engine 80 to locate a producer within a predetermined range of the location 46 based on specific search criteria (e.g., range). The search engine 80 may feature a graphical user interface which includes a map displaying all available producers 2 and/or stringers 44 near the location 46 based on the GPS coordinates reported by the producers 2 and/or stringers 44. The user interface may also include a legend which lists all of the available producers 2 and/or stringers 44 including information about the stringers 44 extracted from the producer database 56.

Once a suitable producer 2 and/or stringer 44 is found, the news organization contacts the producer 2, either through the information exchange server 74 or directly over the telecommunications network 62 and asks the producer 2 to produce and transmit video of the event. The transmission of the information segment 22 and/or 56 may be either through the information exchange server 74 and the Internet 90 or directly over the telecommunications network 62.

The news organization and the producer 2 may negotiate a fee for the video segment, or the news organization may simply agree to a fee calculated by cost estimator 82 based on the billing rate information stored in the producer database 76. As the news organization receives the live video feed from the producer, the news organization server 84 may relay the information segment 22 and/or 56 to viewers' personal computers 90 over the Internet or to viewers' televisions 102 over the cable network 104. In addition, the information segment 22 and/or 56 may be stored in the video buffer 78 for future use by the news organization and/or other viewers.

Figure 4A:
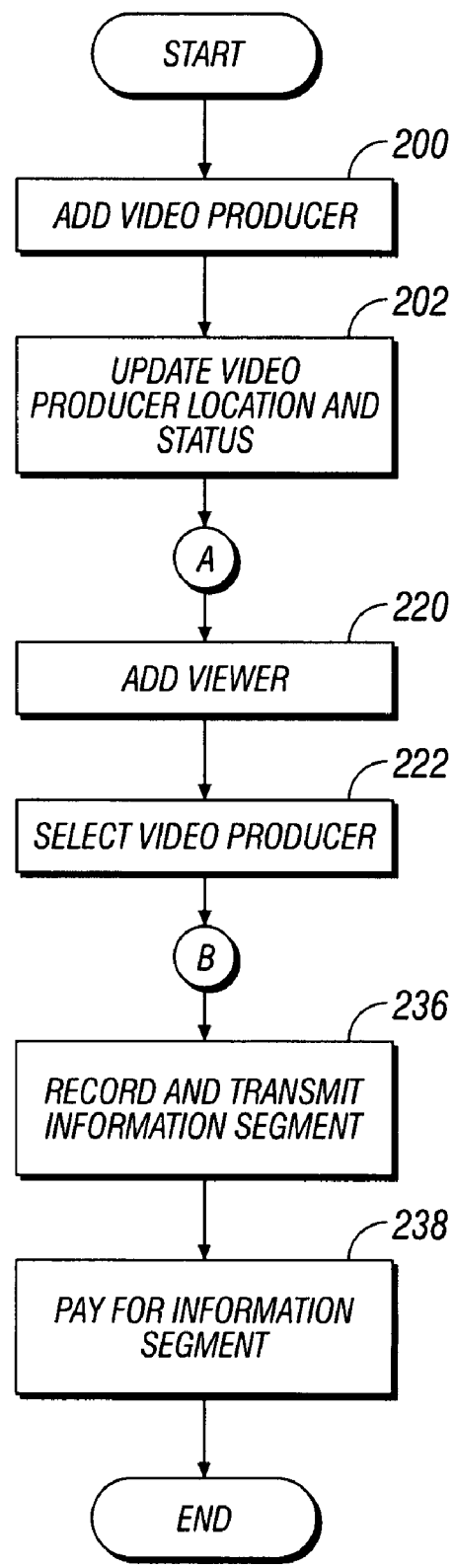
FIGS. 4A-C illustrate a flow diagram showing a video on request method according to the present disclosure.
Figure 4B:
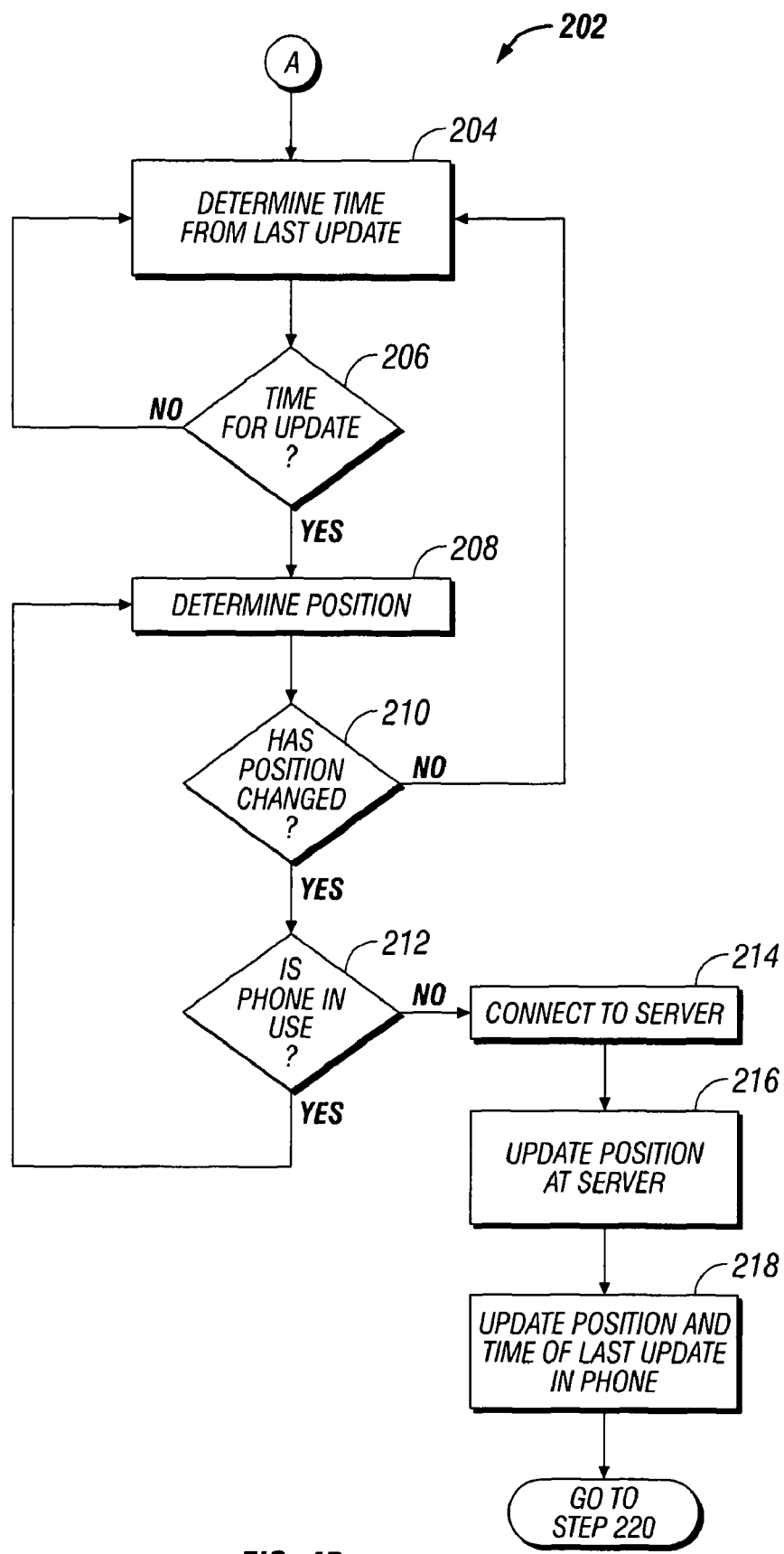
Figure 4C:
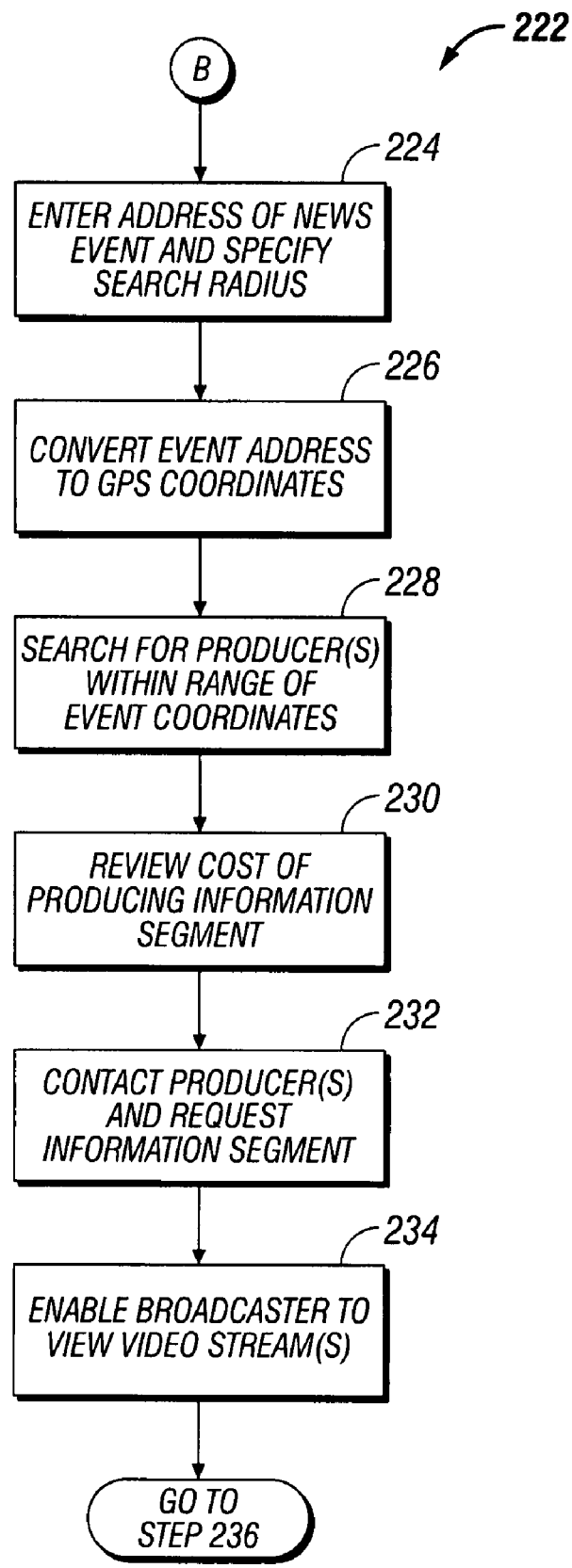

FIGS. 4A-C illustrate a method for matching producers 2 with the viewers 14 through the information exchange 6. In step 200, the producer profile 8 is created by the producer 2 who provides his information (e.g., name and contact information, billing rate, etc.) along with current location and status to the information exchange 6. The information exchange 6 then stores the information in the producer database 76. Subsequently, as the location and status of the producer 2 changes, in step 202, the producer 2 updates the location and status with the information exchange 6 either manually or automatically via the location device 10.

FIG. 4B illustrates an automated method for updating of the location of the producer 2. The method may be implemented as a software application which may run in the background on the cellular phone 60. In step 204, it is determined the time that has elapsed from the last update. In step 206, the elapsed time is then compared at pre-set intervals, e.g., one hour, to determine if it is time for an update. In step 208, if it is time for an update, the location device 66 determines the current location of the producer 2. In step 210, the cellular phone 60 compares the current location to the producer's previous position. If the position has changed by a predetermined distance (e.g., 100 meters), it is determined whether the cellular phone 60 is running any applications (e.g., phone call, video transmission, etc.). If the cellular phone 60 is in use (e.g., busy executing another application), the method loops back to step 208 to continue determining the position and whether it has changed. If the cellular phone 60 is not in use, in step 214 the cellular phone 60 connects to the information exchange server 74 over telecommunications network 62 and in step 216 updates the producer's location in the producer database 76. In addition, the cellular phone 60 in step 218 updates the producer's location and the time of the last update internally and begins the loop again.

With reference to FIG. 4A, in step 220, viewer 14 who wishes to search the information exchange 6 for suitable producers register with the service. In step 222, the viewer 14 searches the producer database 76 using the search engine 80 by location and availability in order to find a suitable producer 2 at or near a certain location.

FIG. 4C illustrates a method for searching for a suitable producer 2. In step 224, the viewer 14 searches the producer database 76 by entering the location (e.g., address) of a breaking news event and the radius within which to search for available producers 2, e.g., 10 kilometers. In step 226, information exchange 6 receives the search query and converts the address into location (e.g., GPS) coordinates and in step 228 searches for location coordinates of producers within the predefined range of the event. In step 230, the viewer 14 is presented with the cost of producing the information segment 22 from the location based on the calculation from the cost estimator 82. In step 232, the viewer 14 contacts the producer 12 and requests production of the information segment 22. In step 234, the producer 2 adds the viewer 14 to a list of users who may receive the transmission of the information segment 12.

Referring back to FIG. 4A, in step 236, the producer 2 records and transmits the information segment 22 to the list of authorized viewers. The video may be sent point-to-point directly to the viewer 14, or it may be sent through the information exchange 6. In step 238, the viewer 14 pays for the information segment 22 which may be made directly to the producer 2 or to the information exchange 6. In certain embodiments where royalties must be paid, the payment is sent to the royalty pool 28 so that payment can be remitted to third parties.

It is to be understood that the present disclosure may be implemented in various forms of hardware, software, firmware, networks, special purpose processors, or a combination thereof. In one embodiment, the present disclosure may be implemented in software as an application program tangibly embodied on a program storage device. The application program may be executed by a computer system comprising any suitable architecture such as a personal computer, a workstation or server, or mobile computing device.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A video on request system comprising:
   at least one producer having a location device for providing location data and a video recording device;
   an information exchange having a producer database configured to store at least one producer profile having at least one producer property selected from the group consisting of a current location and status, wherein the current location and status are continually updated based on the location data; and
   at least one viewer having access to the information exchange to search the producer database for the at least one producer which is available and within a predetermined range of a desired location, wherein upon finding the at least one producer which is available and at the desired location, the at least one viewer requests an information segment to be produced by the at least one producer from the desired location.

2. A video on request system according to claim 1, further comprising a cost estimator that provides an estimate of production costs for the information segment based on cost information provided by the at least one producer to the producer database.

3. A video on request system according to claim 1, further comprising a search engine including a graphical user interface having a map displaying a plurality of available producers within the predetermined range of the desired location.

4. A video on request system according to claim 1, further comprising a royalty pool for collecting royalties from the at least one viewer and the at least one producer to pay an owner of the desired location.

5. A video on request system according to claim 1, further comprising a buffer configured to store a copy of the information segment and to retransmit the information segment.

6. A video on request system according to claim 1, wherein the video recording device is a cellular phone.

7. A video on request system comprising:
   a cellular phone associated with a producer, the cellular phone includes a location device for providing location data and is configured to record and stream video, the cellular phone being connected to a telecommunications network;
   an information exchange server including a producer database configured to store at least one producer profile having at least one producer property selected from the group consisting of a current location and status, wherein the current location and status are continually updated based on the location data, the information exchange server also including a search engine for searching the producer database; and
   a news organization server configured to access the search engine to search the producer database for the producer which is available and within a predetermined range of a desired location, wherein upon finding the producer which is available and at the desired location, the news organization server requests an information segment to be produced by the producer from the desired location, in response to the request the producer records the information segment and transmits the information segment to the news organization server.

8. A video request system according to claim 7, wherein the news organization server is connected to a cable network, the news organization server is configured to broadcast the information segment over the cable network.

9. A video request system according to claim 7, further comprising:
   a personal computer associated with a viewer, the personal computer connected to the information exchange server through a network, the personal computer configured to access the search engine to search the producer database for the producer which is available and within a predetermined range of a desired location, wherein upon finding the producer which is available and at the desired location, the personal computer requests an information segment to be produced by the producer from the desired location, in response to the request the producer records the information segment and transmits the information segment to the personal computer.

10. A video request system according to claim 7, wherein the location device is a Global Positioning System device configured to determine the current location as a function of Global Positioning System coordinates.

11. A video request system according to claim 7, wherein the information exchange server includes a buffer configured to store a copy of the information segment and to retransmit the information segment.

12. A method for providing a video on request service, the method comprising the steps of:
   generating a producer profile associated with a producer having a location device for providing location data and a video recording device, the producer profile having at least one producer property selected from the group consisting of a current location and status, wherein the producer profile is stored in a producer database of an information exchange;
   updating the current location and status based on the location data;
   searching the producer database for the producer which is available and within a predetermined range of a desired location; and
   requesting an information segment to be produced by the producer from the desired location.

13. A method according to claim 12, wherein the updating step includes the steps of:
   determining whether a predetermined time period has elapsed since a previous update;
   obtaining the location data from the location device; and
   contacting the information exchange to update the current location within the producer profile based on the location data.

14. A method according to claim 13, wherein the updating step further includes the steps of:
   determining whether the current location is within a predetermined range of a previous location; and
   verifying whether the video recording device is capable of contacting the information exchange.

15. A method according to claim 14, wherein the updating step further includes the step of:
   recording the current location as the previous location and the time of the update.

16. A method according to claim 12, wherein the searching step includes the steps of:
   entering a desired range and the desired location in address format as a search query in a search engine of the information exchange; and
   converting the address format into Global Positioning System coordinates.

17. A method according to claim 16, wherein the searching step further includes the step of:
   searching for the producer which is available and within the desired range of the desired location.

18. A method according to claim 12, further comprising the step of:
   paying the information exchange for the recording and transmitting the information segment.

19. A method according to claim 12, further comprising the step of:
   recording and transmitting the information segment in response to the request.

* * * * *